(12) United States Patent  
Benecke et al.

(10) Patent No.: US 7,024,849 B2  
(45) Date of Patent: Apr. 11, 2006

(54) CHAIN LOCK

(75) Inventors: Rainer Benecke, Dortmund (DE); Jürgen Berghoff, Holzwickede (DE); Thorsten Wirtz, Hilden (DE)

(73) Assignee: J.D. Theile GmbH & Co. KG, Schwerte (DE)

( * ) Notice: Subject to any disclaimer, the term of this patent is extended or adjusted under 35 U.S.C. 154(b) by 0 days.

(21) Appl. No.: 11/152,426

(22) Filed: Jun. 14, 2005

(65) Prior Publication Data

US 2005/0274102 A1 Dec. 15, 2005

(30) Foreign Application Priority Data

Jun. 15, 2004 (DE) .................. 10 2004 028 901

(51) Int. Cl.  
*F16G 15/04* (2006.01)

(52) U.S. Cl. .............................. 59/85; 59/87

(58) Field of Classification Search ............ 59/78, 59/85, 87  
See application file for complete search history.

(56) References Cited

U.S. PATENT DOCUMENTS

| | | |
|---|---|---|
| 986,938 A | 3/1911 | Nixon |
| 4,090,357 A | 5/1978 | Smith |
| 4,606,188 A | 8/1986 | Osnes et al. |
| 6,021,634 A * | 2/2000 | Brodziak .................. 59/85 |
| 6,223,517 B1 * | 5/2001 | Bogdan et al. ............ 59/85 |

FOREIGN PATENT DOCUMENTS

| | | |
|---|---|---|
| DE | 1 000 193 | 1/1957 |
| DE | 34 29 723 | 3/1985 |
| DE | 298 11 332 | 11/1998 |
| FR | 390.245 | 9/1908 |
| GB | 2 340 577 | 2/2000 |

* cited by examiner

*Primary Examiner*—David Jones  
(74) *Attorney, Agent, or Firm*—Collard & Roe, P.C.

(57) ABSTRACT

A chain lock for high-strength steel chains has two lock parts that are the same and can be joined together in a rotation-symmetry arrangement with one another, in the longitudinal direction. Each lock part has a longitudinal stay having arc segments that follow it at both ends. There are two coupling elements that are configured complementary to one another and are assigned to the two arc segments of each lock part. One of the elements is configured as a locking stay that follows the longitudinal extension of the lock part, and the other element is configured as a stay accommodation. The locking stay of the one lock part engages in the stay accommodation of the other lock part and rests against the complementary coupling surface of the stay accommodation with its coupling surface formed by the face end in the joining direction. The coupling surfaces comprise a coupling surface segment having a defined width, which has no curvature or only an insignificant curvature pointing in the joining direction.

10 Claims, 2 Drawing Sheets

CHAIN LOCK

CROSS-REFERENCE TO RELATED APPLICATION

Applicants claim priority under 35 U.S.C. §119 of German Application No. 10 2004 028 901.8 filed Jun. 15, 2004.

BACKGROUND OF THE INVENTION

1. Field of the Invention

The invention relates to a chain lock for high-strength steel chains, the lock having two lock parts that are the same and can be joined together in a rotation-symmetry arrangement with one another, in the longitudinal direction. There is a longitudinal stay having arc segments that follow it at both ends. One of two coupling elements that are configured complementary to one another is assigned to the two arc segments of each lock part. One of these elements is configured as a locking stay that follows the longitudinal extension of the lock part, and the other element is configured as a stay accommodation. The locking stay of the one lock part that engages in the stay accommodation of the other lock part rests against the complementary coupling surface of the stay accommodation with its coupling surface formed by the face end in the joining direction.

2. The Prior Art

High-strength steel chains are used, among other things, in underground mining, for example as chain scraper conveyors. Such steel chains consist of individual chain links that are linked into one another and welded. To open and close such a steel chain, it has a chain lock. Such a chain lock, which is known as a block lock, is described in German Patent No. DE 298 11 332 U1. A locking stay and a stay accommodation serve as the coupling elements for connecting the two lock parts for forming the chain lock. The locking stay and, accordingly, the stay accommodation, have a coupling surface that is curved at a uniform radius and therefore sickle-shaped, pointing in the joining direction of the two lock parts, in each instance. When tensile stress is applied by the chain links that are hooked into such a chain lock, the coupling elements of the two lock parts that interact with one another automatically lock together. To absorb transverse forces, the coupling surfaces of the locking stays additionally have a projection that forms an undercut, the coupling surface of which is also rounded with a uniform radius. The stay accommodation of the other lock part, which is configured complementary to the locking stay, in order to accommodate it, has a correspondingly dimensioned pocket to accommodate the projection. The essential factor for the ability of the chain lock to withstand stress, in accordance with its intended purpose, is that the coupling surfaces of the locking stays rest against the complementary coupling surfaces of the locking stays of the other lock part, in each instance. Locking pins that are disposed in complementary bores of the joined lock parts, in the region of the arc segments, fix the two lock parts that have been joined together in place, in the longitudinal, i.e. joining direction.

Block locks of the aforementioned type have proven themselves in practice, because of their strength and also because of their great resistance to tensile stress. Nevertheless, it would be desirable if the durability of such a chain lock could be improved, in order to increase the useful lifetime, without having to configure the chain lock, i.e. its longitudinal stays and its arc segments, with greater material thickness for this purpose.

SUMMARY OF THE INVENTION

This task is accomplished, according to the invention, by means of a chain lock in which the coupling surfaces comprise a coupling surface segment having a defined width, which has no curvature or only an insignificant curvature pointing in the joining direction.

In this chain lock, the coupling surfaces of the two lock parts that rest against one another when the chain lock is closed each have a coupling surface segment that is straight or essentially straight, and therefore has only a slight curvature. This straight coupling surface segment can be connected with the two side surfaces of the locking stay or the stay accommodation, respectively, by way of two coupling surface transition segments curved at a defined radius. Likewise, it is possible that the entire coupling surface is formed by the coupling surface segment just described. It has surprisingly been shown that by providing coupling surfaces having such a coupling surface segment, particularly a straight one, which runs crosswise to the joining direction of the two lock parts, the durability can be increased to a significant extent. The result is surprising since the coupling surface serving for force transfer, as such, is smaller, because of the straight or only insignificantly curved coupling surface segments, than the coupling surface of a locking stay that has a uniform curvature as in the aforementioned state of the art. For this reason, it would have been assumed, at first, that a reduction in the available coupling surface would have a disadvantageous effect on the tensile stress and the durability. In contrast, the surface components of the coupling surface that are oriented perpendicular or almost perpendicular to the joining direction are decisively enlarged in the case of the stressed chain lock, as compared with the previously known state of the art discussed initially.

The width of the straight coupling surface segment oriented crosswise to the joining direction is adapted to the size of the chain lock as well as to the radius of the coupling surface transition segments that preferably follow it, and amounts to more than 3 mm in the case of a 34 chain, perhaps 5 mm. In the case of chain locks with a smaller standard, the straight coupling surface segment oriented crosswise to the joining direction is configured to be correspondingly narrower, e.g., only 1 mm or even less, for example. The coupling surface segments for chain locks of a larger standard can be configured to be correspondingly wider.

To absorb transverse forces, the coupling surfaces of the locking stays can have an undercut projection, and the stay accommodations can have a corresponding pocket for accommodating the projection. It is practical if the projections of the locking stays extend only in the joining direction, but they can also extend all the way into the side surfaces.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
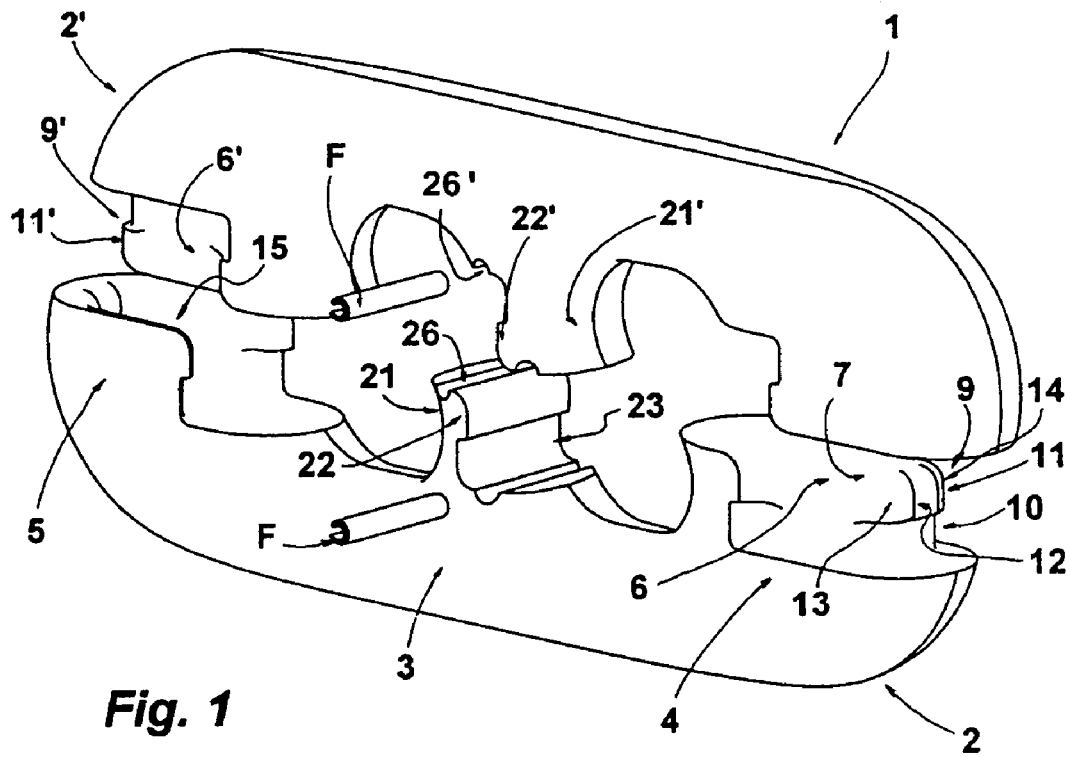
FIG. 1 shows an open chain lock formed from two lock parts, in a perspective view, in the manner of an exploded view.

Referring now in detail to the drawings, there is shown a chain lock 1 for a high-strength steel chain, which consists of two lock parts 2, 2'. Lock parts 2, 2' are structured identically with regard to their essential characteristics, which are described below, and are disposed with a rotational symmetry in the joining direction, relative to one another, in FIG. 1, to form the chain lock. In the following, the lock part 2 will be described in greater detail at first; the lock part 2' has a corresponding structure.

Lock part 2 has a longitudinal stay 3, followed by an arc segment 4, 5 at both ends, in each instance. Arc segments 4, 5 have coupling elements with which lock part 2 can be connected with lock part 2'. The coupling elements of arc segments 4, 5 are configured to be complementary to one another. Arc piece 4, as a coupling element, bears a locking stay 6, the longitudinal expanse of which follows the longitudinal expanse of lock part 2. The locking stay is formed by two side surfaces 7, 8, which run towards one another at a slight angle, for example at 4°, in the direction towards the outside of arc segment 4. A coupling surface indicated as a whole with reference symbol 9 follows straight side surfaces 7, 8, towards the free end of locking stay 6. In the region of the coupling surface 9, locking stay 6 has a projection projecting in the direction of the longitudinal expanse of lock part 2 and therefore in the joining direction, forming an undercut 10. Coupling surface 9 is thereby formed by the surface of locking stay 6 that points towards the outside of arc segment 4, with projection 11 and undercut 12. Coupling surface 9 itself comprises a straight, uncurved coupling surface segment 12 that runs at a right angle to the longitudinal expanse of lock part 2. The coupling surface segment 12 is connected with side surfaces 7, 8, by means of coupling surface transition segments 13, 14 curved at a defined radius. Coupling surface 9 has these characteristics both in the region of projection 11 and in the region of undercut 12.

Figure 2A:
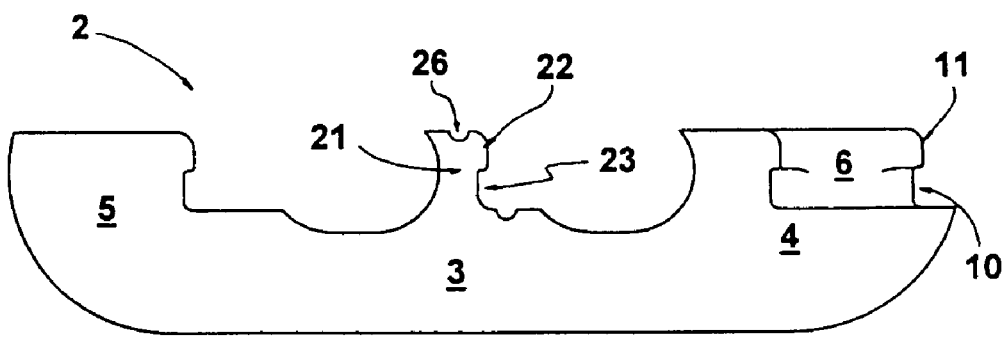
FIGS. 2a, 2b show a side view (FIG. 2a) and a top view (FIG. 2b) of the lower lock part of FIG. 1.
Figure 2B:
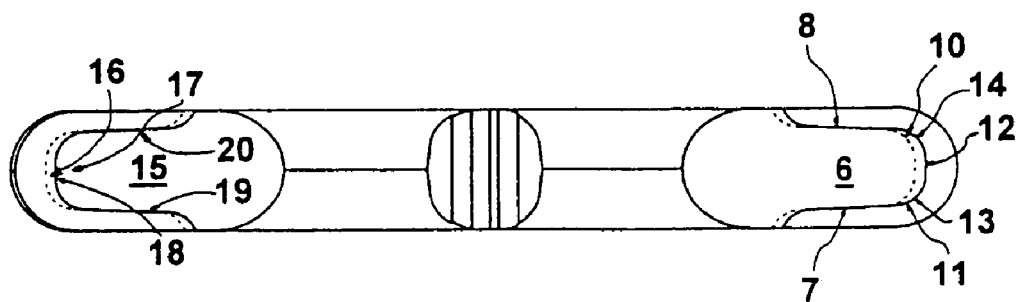
Figure 3:
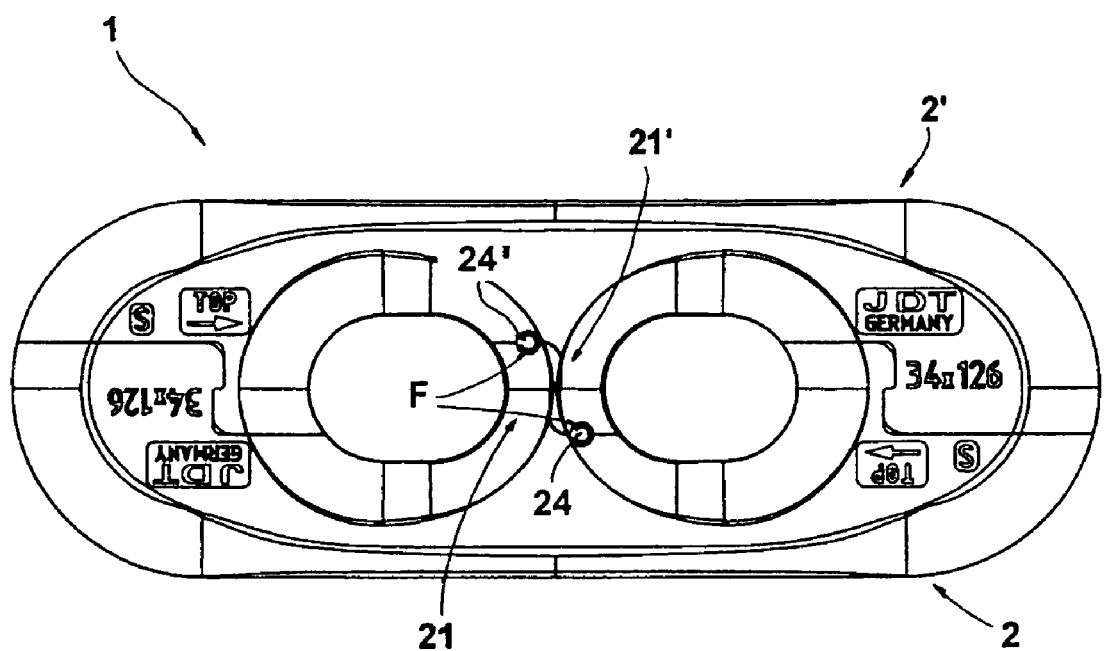
FIG. 3 shows a side view of the chain lock formed by joining together the two lock parts of FIG. 1.

Arc segment 5, as a coupling element, bears a stay accommodation 15 that is configured to be complementary to locking stay 6 described above, so that locking stay 6 of lock part 2 can also be accommodated in it. Therefore, the stay accommodation 15 also has a pocket 16 for accommodating projection 11' of locking stay 6' of lock part 2'. The inner wall surface of stay accommodation 15, which points to the outside of arc segment 5, is configured to be complementary to coupling surface 9 or coupling surface 9' of lock part 2' respectively. Locking stay 6' of lock part 2' that is inserted into the stay accommodation 15 then rests against the complementary coupling surface with its coupling surface 9' and against the inside wall surfaces of stay accommodation 15 with its side surfaces. Therefore stay accommodation 15, together with its pocket 16, also has a coupling surface 17 having a straight, uncurved coupling surface segment (see FIG. 2) that runs at a right angle to the longitudinal expanse of the stay accommodation 15. The side surfaces 19, 20 of stay accommodation 15 are also narrowed at the same narrowing angle, running towards the outside of arc segment 5, at which side surfaces 7, 8 of locking stay 6 or 6' are narrowed.

In the embodiment shown, lock parts 2, 2' bear a center stay continuation 21, 21' in each instance. Center stay continuation 21 has a projection 22 that points in the direction of projection 11 of locking stay 6, in the region of its upper end, by means of which an undercut 23 is formed. The depth of undercut 23 corresponds to the depth of undercut 10 of locking stay 6. Center stay continuation 21 is conceived analogously, so that projection 22 of center stay continuation 21 engages in undercut 23 of center stay continuation 21 when the two lock parts 2, 2' are joined together.

Two spring sleeves F serve to secure the two lock parts 2, 2' that have been connected with one another, as securing elements, which are disposed in complementary bores 24, 24' in the region of the parting surfaces of center stay 25 formed by center stay continuations 21, 21'. The arrangement of the two bores 24, 24' in the region of center stay 25 has the advantage that the spring sleeves F are easily accessible at any time, even when chain links are hooked into chain lock 1. In the case of the exemplary embodiment shown in the figures, two bores 24, 24' are provided to accommodate a spring sleeve F, in each instance. Bores 24, 24' for accommodating a spring sleeve, in each instance, are made in the center stay 25, in the region of a parting surface that extends in the joining direction of the two lock parts 2, 2 Accordingly, bores 24, 24' are formed by two recesses 26, 26' that are each made in a center stay continuation 21 or 21' respectively. Since the two lock parts 2, 2' are connected, with a positive lock, by means of the claw-like engagement of the projections 22, 22' of the center stay continuations 21, 21' in the undercut 23 that is formed, in each instance, as well as by means of engagement of the projections 11, 11' of the locking stays 6, 6' in the pockets 16 of the stay accommodations 15, in the transverse direction, the bores 24, 24', the center stay projections 21, 21' or parts of them do not have to be configured in such a manner that transverse forces have to be additionally absorbed by the securing element(s).

Instead of the exemplary embodiment shown in the figures, in which two bores 24, 24' are provided to accommodate a spring sleeve, in each instance, it is equally sufficient, for securing the two lock parts 2, 2' that have been joined together, to dispose only a single securing element in the region of center stay 25, or to provided only one bore of the type described above, in the region of center stay 25.

Accordingly, while only a few embodiments of the present invention have been shown and described, it is obvious that many changes and modifications may be made thereunto without departing from the spirit and scope of the invention.

REFERENCE SYMBOLS 1 chain lock
2, 2' lock part
3 longitudinal stay
4 arc segment
5 arc segment
6, 6' locking stay
7 side surface
8 side surface
9, 9' coupling surface
10 undercut
11, 11' projection
12 straight coupling surface segment
13 coupling surface transition segment 14 coupling surface transition segment
15 stay accommodation
16 pocket
17 coupling surface
18 coupling surface segment
19 side surface
20 side surface
21, 21' center stay continuation
22, 22' projection
23 undercut
24, 24' bore for locking element
25 center stay
26, 26' recess
F spring sleeve as securing element

What is claimed is:

1. A chain lock for high-strength steel chains, comprising two identical lock parts joined together in a symmetric arrangement with one another, in a longitudinal direction; each lock part comprising:
  a longitudinal stay having arc segments at both ends,
  two coupling elements that are configured complementary to one another and being connected to each of the two arc segments of each lock part, one of said elements being configured as a locking stay that extends in a longitudinal direction of the lock part and the other of said elements being configured as a stay accommodation, wherein the locking stay of one lock part engages in the stay accommodation of the other lock part, said locking stay having a coupling surface formed by a face end of the stay and resting against a complementary coupling surface of the corresponding stay accommodation, in a joining direction,
  wherein the coupling surfaces comprise a coupling surface segment having a defined width, said segment having substantially no curvature in the joining direction.

2. A chain lock according to claim 1, further comprising a transition segment that follows the uncurved or only slightly curved coupling surface segment on both sides, to connect the coupling surface segment to side surfaces of the locking stay accommodation, respectively.

3. A chain lock according to claim 2, wherein the coupling surface transition segments are curved.

4. A chain lock according to claim 1, wherein the coupling surface of the locking stay comprises a projection that points in the joining direction, forming an undercut, and wherein the stay accommodation has a pocket for accommodating the projection of the locking stay of the other lock part.

5. A chain lock according to claim 1, wherein the coupling surface segment that points in the joining direction is a straight segment that extends at a right angle to a longitudinal expanse of the locking stay or of the stay accommodation, respectively.

6. A chain lock according to claim 1, wherein the chain lock is secured by at least one securing element that is inserted into a bore that engages in both lock parts, said bore being disposed in a region of a center stay of the lock.

7. A chain lock according to claim 6, wherein the bore for accommodating the securing element is disposed in a region of a parting surface segment of the center stay that extends in a joining direction and is formed by two center stay continuations, and wherein each center stay continuation has a recess that forms the bore when the lock parts are joined.

8. A chain lock according to claim 7, wherein the center stay is divided in a transverse direction to a plane of the chain lock in at least one segment, so that the center stay continuation of each lock part has a coupling surface that points in the longitudinal direction.

9. A chain lock according to claim 8, wherein each center stay continuation has a claw-like projection in a region of its free end, pointing in the joining direction, said projection forming an undercut.

10. A chain lock according to claim 6, wherein the securing elements comprise two spring sleeves.

* * * * *